US006276704B1

(12) United States Patent
Suiter

(10) Patent No.: US 6,276,704 B1

(45) **Date of Patent: *Aug. 21, 2001**

(54) ADJUSTABLE WHEELCHAIR HAVING A TILTING AND RECLINING SEAT

(76) Inventor: Charles J. Suiter, 700 Eastridge Dr., Lincoln Lancaster County, NE (US) 68510

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,287

(22) Filed: Sep. 23, 1998

Related U.S. Application Data

(60) Provisional application No. 60/059,818, filed on Sep. 23, 1997, and provisional application No. 60/084,074, filed on May 4, 1998.

(51) Int. Cl.[7] .......... B62M 1/14

(52) U.S. Cl. .......... 280/250.1; 280/304.1; 180/907; 297/327; 297/411.2; 297/423.2; 297/DIG. 4

(58) Field of Search .......... 280/250.1, 304.1, 280/650; 180/907; 297/327, 326, 328, 411.2, 423.2, 423.22, DIG. 4; 248/118; 224/407, 422, 401, 430

(56) References Cited

U.S. PATENT DOCUMENTS

| | | | | |
|---|---|---|---|---|
| 3,167,284 | * | 1/1965 | Lynch | 224/422 |
| 3,295,518 | * | 1/1967 | Hazlewood et al. | 128/877 |
| 3,325,215 | * | 6/1967 | Murcott | 297/423.22 |
| 3,902,758 | * | 9/1975 | Pivacek | 297/423.22 |
| 4,569,409 | * | 2/1986 | Kluth | 180/8.2 |
| 4,679,849 | * | 7/1987 | Torgny | 280/250.1 |
| 4,762,255 | * | 8/1988 | Dunn | 224/440 |
| 4,834,411 | * | 5/1989 | Willey et al. | 280/250.1 |
| 4,893,827 | * | 1/1990 | Gay et al. | 280/250.1 |
| 4,934,723 | * | 6/1990 | Dysarz | 280/250.1 |
| 4,957,254 | * | 9/1990 | Hill et al. | 248/207 |
| 5,044,647 | * | 9/1991 | Patterson | 280/250.1 |
| 5,145,197 | * | 9/1992 | Gatti | 280/304.1 |
| 5,217,239 | * | 6/1993 | Koet | 280/250.1 |
| 5,356,172 | * | 10/1994 | Levy et al. | 280/250.1 |
| 5,407,330 | * | 4/1995 | Rimington et al. | 417/312 |
| 5,713,591 | * | 2/1998 | Zarkhin et al. | 280/205.1 |
| 5,772,226 | * | 6/1998 | Bobichon | 280/250.1 |
| 5,803,327 | * | 9/1998 | Nipper et al. | 224/407 |
| 5,944,338 | * | 8/1999 | Simpson | 280/650 |
| 6,003,624 | * | 12/1999 | Jorgensen et al. | 180/907 |
| 6,003,940 | * | 12/1999 | Jackson | 297/411.2 |
| 6,022,076 | * | 2/2000 | Samson | 297/328 |

* cited by examiner

*Primary Examiner*—Lanna Mai
*Assistant Examiner*—Ruth Ilan
(74) *Attorney, Agent, or Firm*—Suiter & Associates PC

(57) ABSTRACT

A wheelchair includes a frame and a seat having seat bottom and a reclining seat back. The seat may be suspended within the frame via seat suspension arms which tilt the seat about a substantially horizontal axis located above the seat bottom. The wheelchair may include leg supports which may pivot beneath the seat bottom when not in use and arm rests having a hand support including a perimeter edge provided with a plurality of indentations for accepting and at least partially extending fingers of a user's hand.

12 Claims, 6 Drawing Sheets

ADJUSTABLE WHEELCHAIR HAVING A TILTING AND RECLINING SEAT

CROSS-REFERENCES TO RELATED APPLICATIONS

The present application claims the benefit under 35 U.S.C. § 119 of U.S. Provisional application Ser. Nos. 60/059,818, filed Sep. 23,1997 and 60/084,074, filed May 4, 1998. Said U.S. Provisional application Ser. Nos. 60/059, 818 and 60/084,074 are herein incorporated by reference in their entirety.

FIELD OF THE INVENTION

The present invention relates generally to wheelchairs and more particularly to wheelchairs having tilting or reclining seats, seat backs, or the like.

BACKGROUND OF THE INVENTION

Conventional wheelchairs typically comprise a non-reclining seat made of a flexible material such as vinyl, canvas or the like stretched across a frame which is supported between two large drive wheels and two small front swivel casters. Normally, conventional wheelchairs may be made to fold or collapse by drawing the sides of the wheelchair's frame together, thereby reducing its width. This allows the wheelchair to be more easily handled and stored.

Many elderly or handicapped persons spend a large part of each day in a wheelchair. However, conventional folding wheelchairs are not well suited for such extended use and may adversely affect the health of these persons. For example, elderly persons may develop sores or flexion contractures of the hips and knees because they are physically unable to shift their weight in the wheelchair. Similarly, kyphosis, an abnormal curvature of the spine which commonly afflicts the elderly, may be aggravated by sitting upright for long periods of time. Persons suffering this condition may thus be forced to remain in bed for a greater portion of the day, adversely affecting their quality of life.

To address these problems, wheelchairs having seats with reclining backrests were developed. These wheelchairs allow a user to shift his or her weight by reclining the seat back to decrease pressure on bony prominences and reduce the likelihood of developing sores and muscle aches and spasms. Reclining wheelchairs may also position a kyphosis afflicted user so that gravity may help reverse or retard his or her condition. Further, reclining wheelchairs may provide an improved feeding position for severe kyphosis sufferers, who, when sitting in a conventional chair or wheelchair, would be essentially face down.

For some persons, especially the elderly, independent movement of the seat bottom and seat back may be undesirable because such movement may result in skin shear of an elderly user's back and buttocks. Consequently, it is desirable to provide a tilting seat having a seat bottom and seat back which may be tilted simultaneously at a fixed angle to each other.

The center of gravity of a conventional wheelchair typically lies somewhere forward of an imaginary line extending between its large drive wheels. This positioning of the center of gravity makes the wheelchair extremely stable. However, for a wheelchair having a reclining or tilting seat, the center of gravity of the wheelchair and its user may shift rearward as the seat is reclined or tilted. Consequently, there exists a danger that the wheelchair may tip over and possibly injure is user. To solve this problem, a wheelchair may include a mechanism which allows the seat to be slid forward on a slide, track or the like after it is reclined or tilted to restore the center of gravity to a stable location. However, such mechanisms tend to be extremely complex since they must both tilt or recline the seat and slide the seat forward in the wheelchair frame. Because of this complexity, these mechanisms may also be costly, unreliable and, especially if they are unpowered, difficult, if not impossible, for an elderly user to operate. Further, such mechanisms may be unable to simultaneously recline the seat and slide the seat forward creating a window of time where the wheelchair is susceptible to tipping.

Wheelchairs also typically include leg supports or rests adapted to support a user's legs and feet. Many times, however, a person who is physically unable to stand may have sufficient mobility and strength in his or her legs to still be able to use his or her legs and feet to propel the wheelchair. For these persons, leg supports may make such locomotion difficult if not impossible. However, the same individual, when desiring to rest or remain immobile, may desire leg supports to sit comfortably within the wheelchair.

For these reasons, it would be advantageous to provide a wheelchair having a tilting seat adapted to tilt without upsetting the wheelchair's center of gravity wherein the seat includes a seat back adapted to recline independently of the seat bottom. It would also be advantageous to provide a wheelchair having leg supports adapted to be easily retracted beneath the seat when not in use.

SUMMARY OF THE INVENTION

Accordingly, a principle object of the present invention is to provide a wheelchair having a tilting seat, wherein the seat may be tilted rearward without significantly shifting the wheelchair's center of gravity.

Another object of the present invention is to provide a wheelchair having a reclining seat.

Yet another object of the present invention is to provide a wheelchair having leg supports which may be retracted beneath the seat when not being utilized.

A further object of the present invention is to provide a wheelchair including an arm rest having a hand support wherein a perimeter edge thereof may be provided with a plurality of indentations for accepting and at least partially extending a user's fingers.

The present invention is directed to a novel wheelchair including a seat having a reclining seat back. This seat is suspended within the wheelchair's frame via seat suspension arms such that the seat may tilt about a substantially horizontal axis located above the seat bottom. The wheelchair may further include leg supports pivotally mounted to the seat bottom wherein the leg supports may rotate beneath the seat bottom when they are not being used. Arm rests, which may tilt with the seat, may include a hand support having a perimeter edge provided with a plurality of indentations for accepting and at least partially extending a user's fingers.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
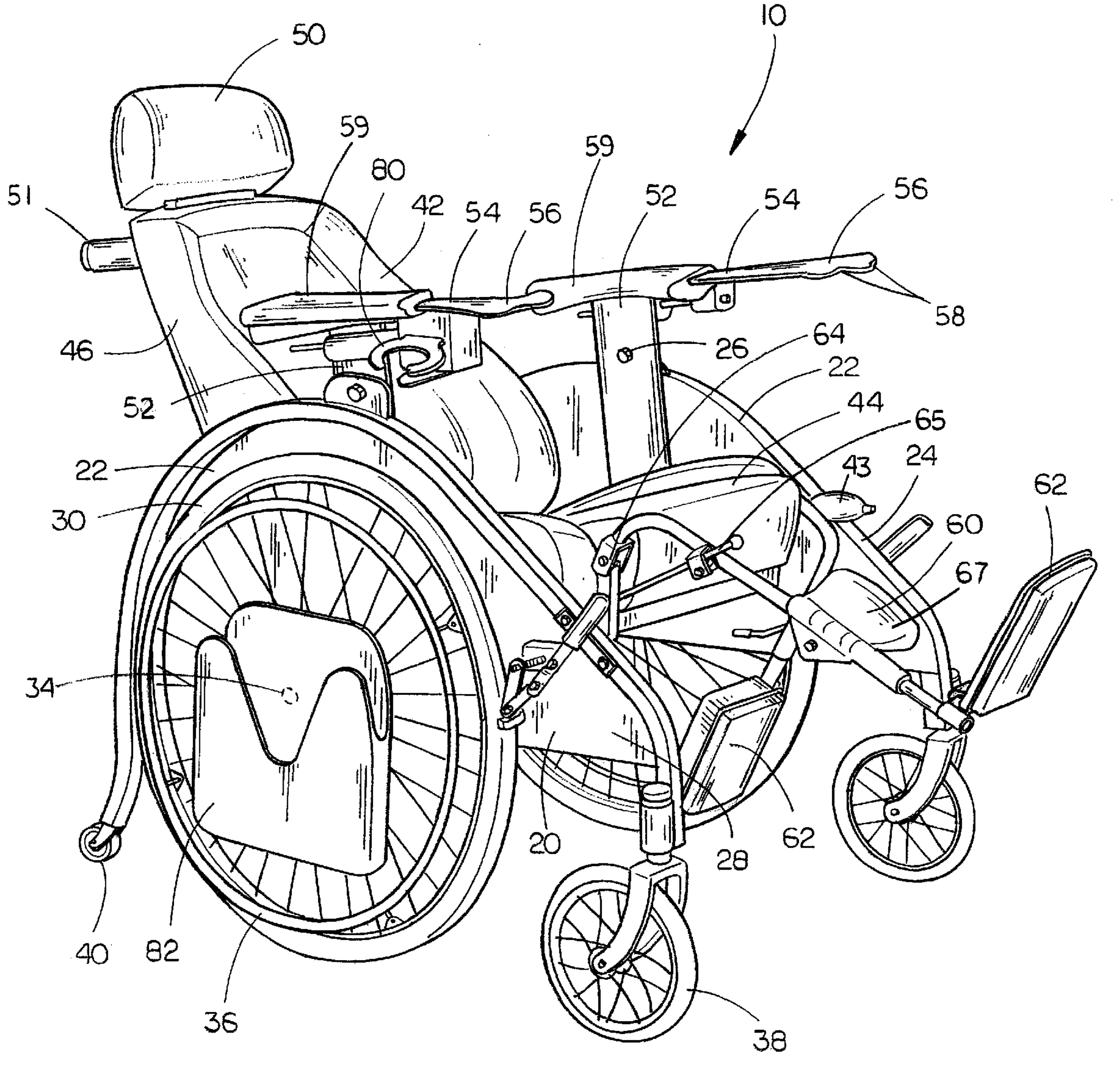
FIG. 1 is a perspective view depicting a wheelchair in accordance with an exemplary embodiment of the present invention.

Referring now to FIG. 1, a wheelchair having a tilting and reclining seat in accordance with an exemplary embodiment of the present invention is shown. The wheelchair, enumerated herein generally as 10, includes a wheelchair frame 20 supporting a seat 42 having a seat bottom 44 and seat back 46. The seat 42 may be suspended within the wheelchair frame 20 via two generally vertical seat suspension arms 52 so that a user, seated in the wheelchair, may cause the seat 42 to be tilted about a generally horizontal axis located above and parallel to the seat bottom 44. In this manner, the seat 42 may be tilted rearward without significantly shifting the wheelchair's center of gravity.

The wheelchair frame 20 preferably comprises left and right frame halves 22 which may be joined together by cross members so that they are held substantially parallel to each other. Each frame half 22 includes an upper frame member 24 and a lower frame member 25 (see FIG. 3) which furnish rigidity to the frame half 22 and provide structure for mounting the wheelchair's drive wheels 30, seat 42, and associated hardware (e.g., cup holders, eye glasses holders, main drive wheel brake, etc.). The upper frame member 24 may have a curvilinear shape consisting of a curved section generally following an arc having a diameter slightly larger than the diameter of the wheelchair's main drive wheels 30 and a straightened section extending forward and downward at an angle from the curved section. In the exemplary embodiment shown in FIG. 1, the upper frame member 24, lower frame member 25 (see FIG. 3), and cross members 23 (see FIG. 3) may be fashioned from square or rectangular tubing formed from a suitable material such as, for example, steel, aluminum, titanium, plastic, or composite providing the desired combination of stiffness, light weight, and ruggedness. A side panel 28 may extend between each upper frame member 24 and each lower frame member. The side panel 28 may provide additional rigidity to the frame half 22 and may prevent the user's hands or clothing from becoming entangled in the spokes of the main drive wheels 30. Preferably, the side panel 28 is formed from thin sheet of a suitable material such as plastic, steel, aluminum, composite material, or the like.

The wheelchair's large drive wheels 30 may be rotatably mounted via axles 34 to the lower frame member 23 (see FIG. 3) of each frame half 22. Each drive wheel 30 may include a conventional hand ring 36 mounted thereto to provide the user with means for manually rotating the drive wheels 30 to provide motion to the wheelchair 10. Smaller wheels or casters 38 may be mounted to a forward lower end of the upper frame member 24. These casters 38 preferably swivel 360 degrees about a vertical axis thereby allowing the wheelchair 10 to be steered by the user, or, alternatively, by an attendant pushing the wheelchair 10.

Anti-tip wheels 40 may be mounted to a rear lower end of the upper frame member 24. Under normal conditions, these wheels 40 do not contact the ground or floor surface (not shown) on which the wheelchair 10 rests. However, at the inception of tipping of the wheelchair 10, for example when a user suddenly shifts his or her weight too far rearward while reclined, the anti tip wheels 40 may come into contact with a ground or floor surface (not shown) on which the wheelchair 10 rests, thereby preventing further tipping of the wheelchair 10.

The seat 42 may include side and hip bolsters or supports for supporting the user's lower back and hips and thighs, respectively, and an adjustable lumbar support for supporting the user's lower back. The lumbar support may, for example, include an air bladder which may be inflated or deflated to increase or decrease the amount of support provided. Preferably, the air bladder may be inflated utilizing a conventional pump mechanism 43. The seat 42 may include a head rest 50 mounted to the top of the seat back 46 for supporting the user's head. This position of the head rest 50 above the seat back 46 may be adjusted to fit the height of the particular user (i.e., adjusted up for taller users or down for shorter users). The head rest 50 may also tilt about a generally horizontal plane parallel to the seat back 46 to, for example, provide additional support the back of the user's neck if so desired. The seat back 46 may further include a grip or handlebar assembly 51 positioned below the head rest 50 to allow an attendant, or the like, to maneuver (i.e., push, pull, turn, etc.) the wheelchair 10.

Leg supports 60 may be mounted to the seat bottom 44 to provide support for the legs and feet of a user seated in the wheelchair 10. Each leg support 60 may pivot in a generally vertical plane so that it may be retracted beneath the seat bottom 44 when not being used. For example, many users may be unable to stand for long periods and thus require a wheelchair. However, these users may retain sufficient mobility and strength in their legs to "walk" if their bodies are supported in some manner. By pivotally retracting the leg supports 60 beneath the seat 42, a user seated in the wheelchair 10 may propel the chair utilizing his or her legs and feet.

As shown in FIG. 1, each leg support 60 may be pivotally mounted to the seat bottom 44 via hinge assembly 64 mounted to the seat bottom 44. The leg supports 60 may pivot about the hinge assembly 64 to support the user's legs and feet at multiple angles with the seat bottom 44. Preferably, the angle between each leg support 60 and the seat bottom 44 may be adjusted from approximately 0 degrees to approximately 90 degrees. Further, each leg support 60 may be held in place by locking mechanism 65 such that it may tilt with the seat 42 without changing the angle of the leg supports 60 with respect to the seat bottom (see FIGS. 2A and 2B). In this manner, unnecessary stress on the user's legs and feet may be avoided. A foot rest 62 may be pivotally attached to a bottom end of each leg support 60. In an exemplary embodiment, the footrest 62 may rotated between a retracted (upright) and an extended (lowered) position. Each leg support 60 may include an adjustable support pad 67 for supporting the backs of the user's legs. Preferably, the position of the support pad 67 may adjusted up or down the leg support 60 depending the length of the user's leg. The support pad 67 may also pivot to more comfortably support the user's leg.

Arm rests 54 may be mounted to the seat suspension arms 52. Thus, the armrests 54 tilt simultaneously with the seat 42 to prevent stress to the user's arms as the seat is tilted. Each armrest 52 preferably comprises a hand support 56 having a perimeter edge including a plurality of sculpted indentations 58 adapted to comfortably accept and support the fingers of a user's hand wherein the hand support 56 functions to at least partially extend the user's fingers to an open position from a clenched position. Preferably, the may be slidably and pivotally mounted to the tops of the seat suspension arms 52. In this manner the arm rests may pivot laterally (i.e., about an axis parallel to the side frame half 22) and may slide toward or away from the seat back 46 (when in the upright position). The arm rests 54 preferably comprise a rigid inner shell having a cushioning material molded thereon to provide added comfort to the user. Additional cushions or pads 59 may be added in situations where increased cushioning is required or desired by a particular user.

Accessory devices such as a cup holder 80, a magazine holder 82, glasses holder (not shown), or the like may be provided to enhance the comfort of the user and the versatility of the wheelchair 10. The cup holder 80 may be pivotally mounted to an armrest 54 of the wheelchair 10. Preferably, the bottom of the cup holder may be weighted allowing the cup holder to remain horizontal as the seat 42 is tilted. Alternately, the cup holder 80 may be secured to a frame half 20 so that it does not move as the seat 42 is tilted. The magazine holder 82 preferably comprises a pouch which may be attached to the axle 34 of a main drive wheel 30 of the wheelchair 10 via a bracket or the like so that it remains in an upright position as the drive wheel 30 rotates. In this manner, a user may keep reading materials such as a magazine, book, newspaper or the like conveniently within reach. Alternatively, the magazine holder 82 may be provided as an accessory which may be added to the wheelchair 10 of the present invention or an existing conventional wheelchair.

Figure 2A:
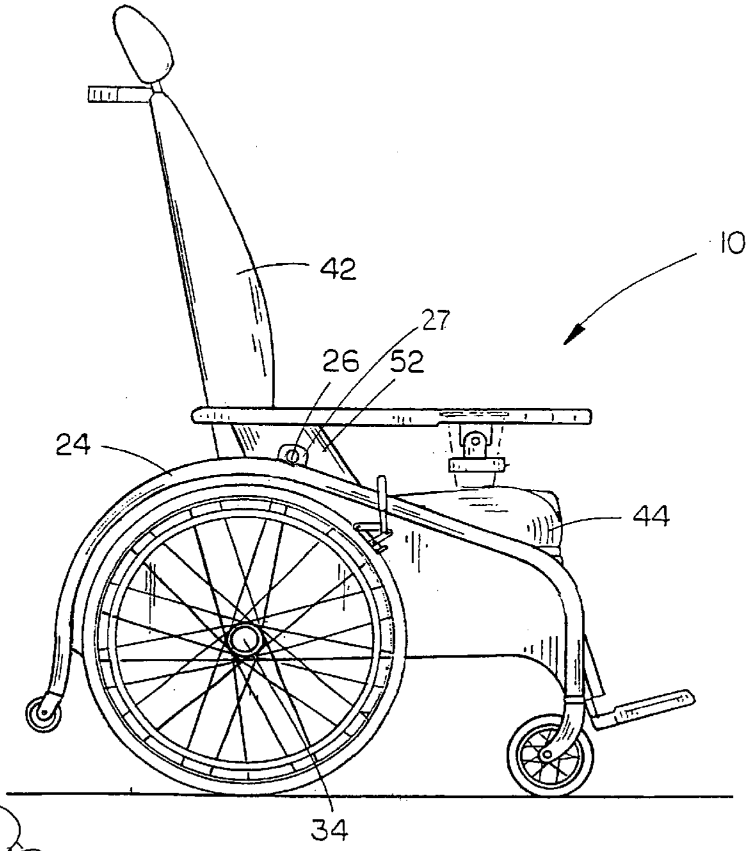
FIG. 2A is a side elevational view of the wheelchair shown in FIG. 1 wherein the seat is shown in an upright position.
Figure 2B:
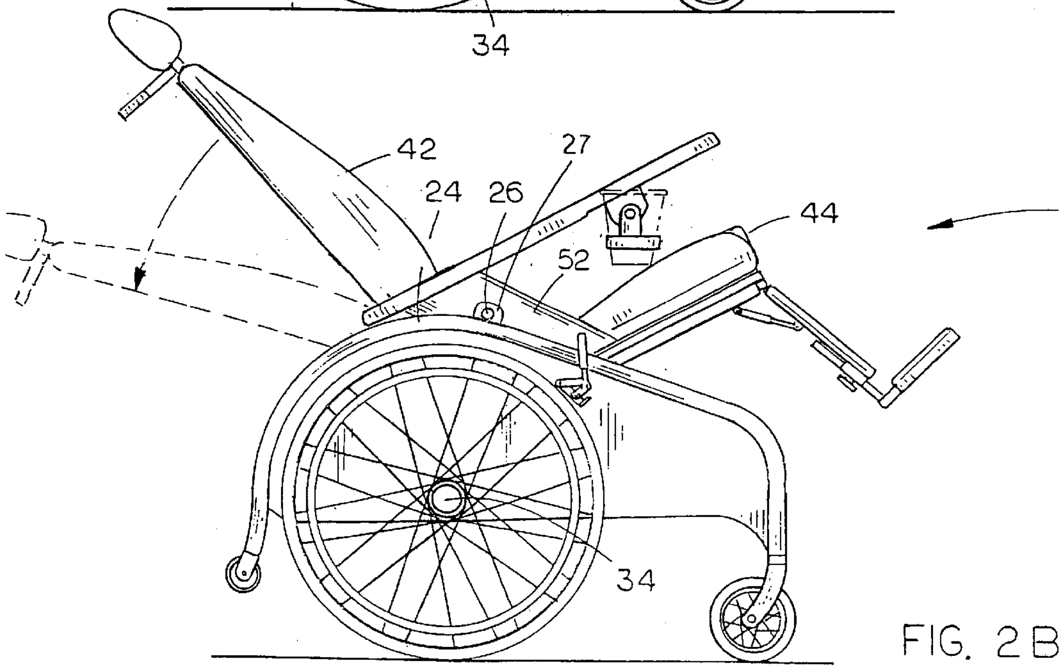
FIG. 2B is a side elevational view of the wheelchair shown in FIG. 1, wherein the seat is shown in a rearward tilted position and wherein the seat back is shown in a reclined position.

Turning now to FIGS. 2A and 2B, tilting of the wheelchair seat within the wheelchair frame is illustrated. The seat 42 of the wheelchair 10 is shown in the fully upright position in FIG. 2A and in a tilted position in FIG. 2B. Preferably, the lower end of each seat suspension arm 52 may be rigidly attached to a side of the seat bottom 44. An upper end of each seat suspension arm 52 may have a hole therein through which a fastener 26 such as a bolt or the like may be inserted to form a pivot. Preferably, the fastener 26 extends through a bracket 27 mounted to the upper frame member 24 at or near its uppermost point of curvature so that the pivot is positioned above and slightly forward of the main wheel axle 34. The seat 42 rotates or tilts through an arc about a horizontal axis extending through the centers of the fasteners 26. Thus, as the seat 42 is tilted, the seat back 46 is tilted rearward and lowered while the seat bottom 44 is simultaneously tilted forward and upward. In this manner, the wheelchair's center of gravity is substantially maintained reducing the likelihood that the wheelchair 10 will tip rearward as the seat 42 is tilted. The seat back 46 may also be reclined with respect to the seat bottom via a reclining mechanism. Preferably, the seat back 46 may be reclined from an upright substantially vertical position (FIG. 2A) to a fully reclined substantially horizontal position (FIG. 2B).

Figure 3:
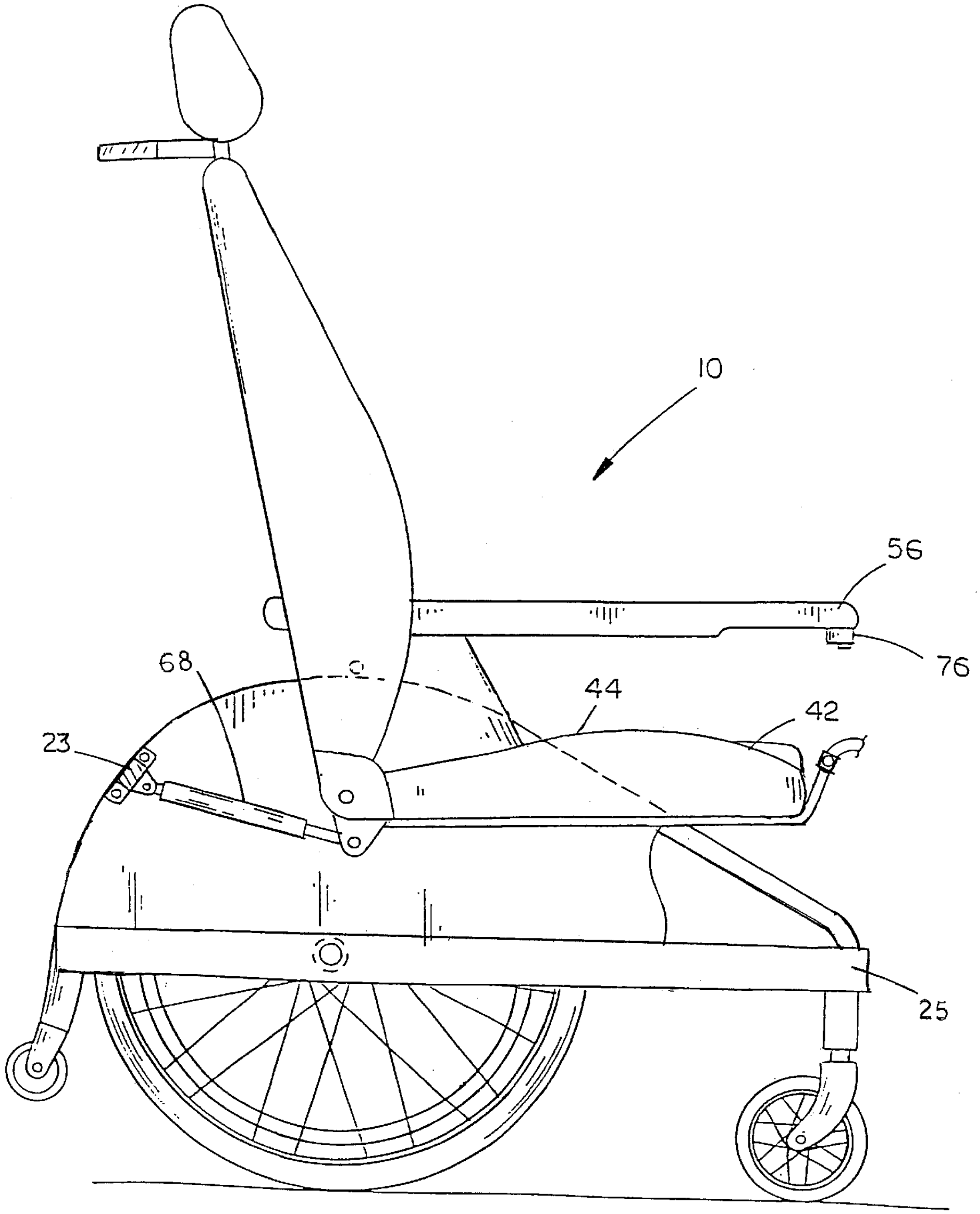
FIG. 3 is a side elevational view of the wheelchair shown in FIG. 1, further illustrating a pneumatic tilting mechanism for tilting the seat within the frame of the wheelchair.

Referring now to FIG. 3, pneumatic apparatus for tilting the seat within the frame of the wheelchair is shown. The wheelchair 10 may include a seat tilt actuator 68 for tilting the seat 42 within the wheelchair frame 20. The seat tilt actuator 68 may be pivotally mounted between the seat bottom 44 and the rear cross-member 23. When the seat tilt actuator 68 is extended, the seat 42 is preferably tilted rearward. Likewise, when the seat tilt actuator 68 is retracted the seat 42 is preferably returned to (i.e., tilted toward) its upright position. The seat tilt actuator 68 may be powered pneumatically. A compressor or pump and an accumulator or air reservoir may provide air pressure to extend the actuator 68, thereby tilting the seat 42. A release valve may be provided to release air pressure from the actuator 68 causing the seat to be returned its upright position. The pump may be electrically powered via a rechargeable battery or may be hand driven (i.e., a plunger type hand pump). Extension and retraction of the seat tilt actuator 68 may be controlled by the user utilizing a controller 76 which may be mounted to a handrest 56.

Figure 4A:
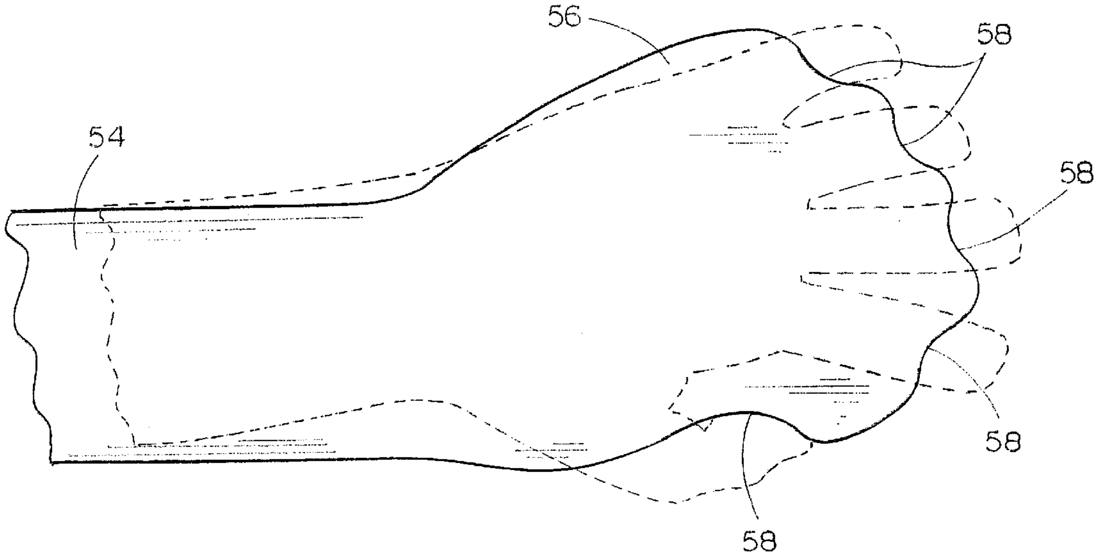
FIG. 4A is a top plan view illustrating therapeutic arm rests adapted to use with the wheelchair of the present invention.
Figure 4B:
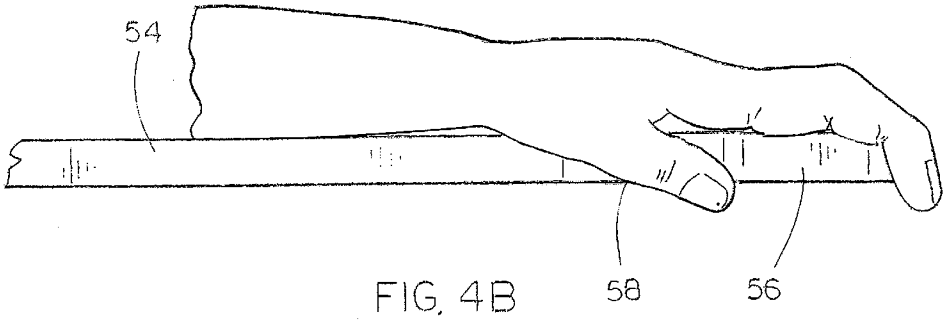
FIG. 4B is a side elevational view of the arm rests shown in FIG. 3A.

Turning now to FIGS. 4A and 4B, arm rests having hand supports according to an exemplary embodiment of the present invention are shown. Each arm rest 54 may include a hand support 56 having a perimeter edge provided with a plurality of sculpted indentations 58. These indentation are positioned to accept and at least partially extend a user's fingers. The arm rest 54 may be formed of metal, plastic, wood or the like having a cushioning material molded thereon to enhance the user's comfort. Further, the arm rest may be tilted with respect to the frame half, for example 20 degrees, to support to the user's arms and hands in a more comfortable position. Similarly, the arm rest may slide toward or away from the seat back depending on the size of the user.

Preferably, the handrest's sculpted indentations 58 are spaced at selected positions corresponding to the appropriate positions of the fingers of a user's hand when the user's hand is resting comfortably on the hand rest 56. In the exemplary embodiment shown, the user may place his or her hand on the hand rest 56 such that his or her fingers extend into the indentations 58 thereby forcing the hand to remain open. As shown in FIG. 4A, the hand rest may have five finger indentations 58 corresponding in position to each of the user's fingers. Alternatively, six or more indentations may be provided allowing the user to shift the position of his or her hand between two or more positions to improve comfort and reduce fatigue.

Figure 5:
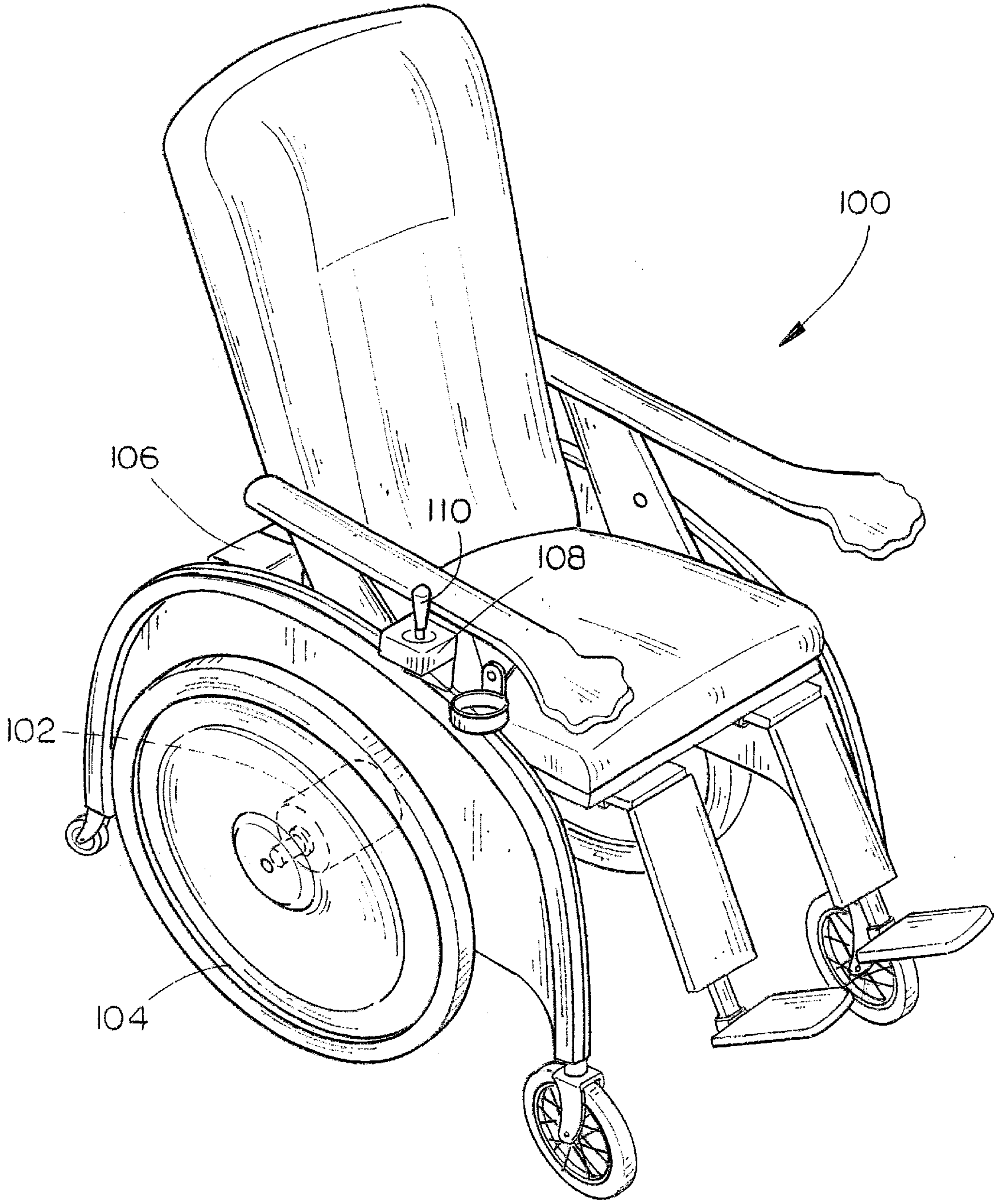
FIG. 5 is a perspective view illustrating a wheelchair in accordance with an alternative embodiment of the present invention employing a motorized drive for propelling the wheelchair's drive wheels.

FIG. 5 illustrates a wheelchair according to an alternative embodiment of the present invention employing a motorized drive system for propelling the wheelchair's drive wheels. In addition to the features and elements of the present invention disclosed with respect to the unpowered embodiment (FIGS. 1 through 4B), this embodiment may include an electric motor 102 adapted to drive the drive wheels 104 and a power source such as a battery 106 or the like, adapted to provide electrical power to the motor 102. A controller 108, which may include a dual-axis joystick control 110, may be mounted to an armrest of the wheelchair 100. The controller 108 may be used to control the direction of travel of the wheelchair 100. For example, by pressing straight and forward on the joystick control 110, the wheelchair 100 preferably will follow a straight line forward. Likewise, by pulling straight back on the joystick control 110, the wheelchair 100 may be made to go in reverse along a straight path. It should also be obvious that by pressing the joystick control 110 forward and to the left the wheelchair 100 will preferably turn left at a rate proportional to the extent the joystick control 110 is moved forward and left, and that by pressing the joystick control 110 forward and to the right, the wheelchair 100 will preferably turn right at a rate proportional to the extent the joystick control 110 is moved forward and right. Preferably, the wheelchair 100 may be steered in a similar fashion for reverse movement.

Figure 6:
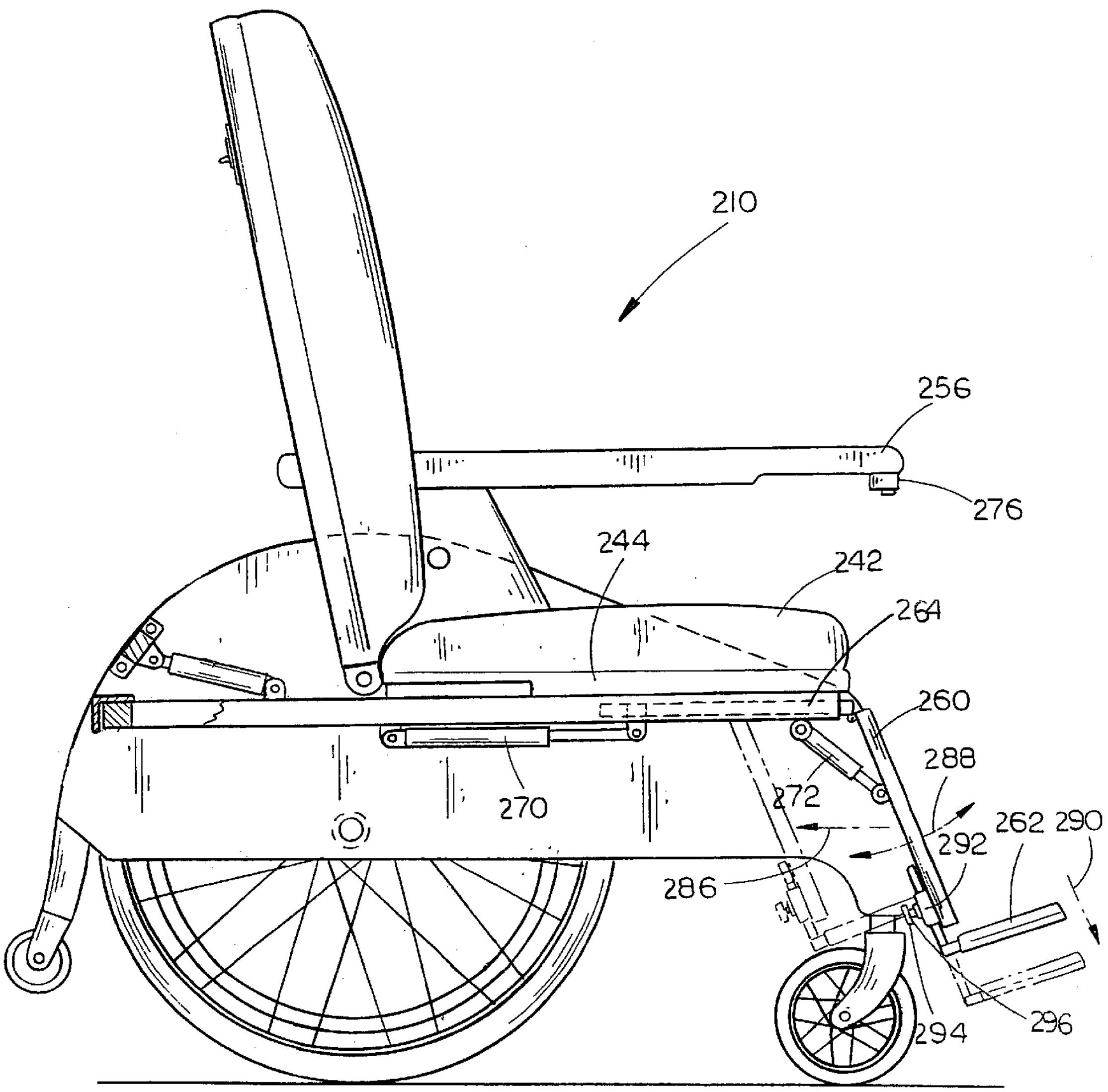
FIG. 6 is a side elevational view of a wheelchair in accordance with an alternative embodiment of the present invention wherein the wheelchair comprises leg supports which slide beneath the seat when not in use.

Referring now to FIG. 6, a wheelchair is shown in accordance with an alternative embodiment of the present invention wherein the wheelchair comprises leg supports which slide beneath the seat when not in use. The leg supports 260 may be pivotally and slidably mounted to the seat bottom 244 to provide support for the legs and feet of a user seated in the wheelchair 210. Each leg support 260 may be slidably retracted in the direction indicated by arrow 286 on a sliding track 264 mounted beneath the seat bottom 244. For example, many users may be unable to stand for long periods and thus require a wheelchair. However, these users may retain sufficient mobility and strength in their legs to "walk" if their bodies are supported in some manner. By slidably retracting the leg supports 260 beneath the seat 242, a user seated in the wheelchair 210 may propel the chair utilizing his or her legs and feet. Preferably, each leg support 260 may be individually hinged to the sliding track 264 allowing each leg support 260 to be pivoted about a horizontal axis through an arc defined by arrow 288 to support the user's legs and feet at various angles with the seat bottom 244. In the embodiment shown in FIG. 6, the angle between each leg support 260 and the seat bottom 244 may be adjusted from approximately 0 degrees to approximately 90 degrees. Further, each leg support 260 may be locked in place such that it may tilt with the seat 242 without changing the angle of the leg supports 260 with respect to the seat bottom (see FIGS. 2A and 2B). In this manner, unnecessary stress on the user's legs and feet may be avoided. A foot rest 262 may be attached to a bottom end of each leg support 260. The footrest 262 may be raised or lowered as indicated by arrow 290 to accommodate the length of the user's legs. The foot rest 262 may include a footrest attachment post 292 which may slidably engage a bottom end of the leg support 260. The footrest 262 may be secured to the bottom end of the leg support 260 by an adjustment device 294 which may, for example, comprise a threaded pin extending through a threaded hole in a brace which may be mounted to the lower end of the leg support 260. A knob 296 affixed to the outer end of the threaded pin preferably allows the user, by applying a twisting motion thereto, to tighten the threaded pin through the threaded hole of the brace to engage the foot rest attachment post 292. Actuators 270 & 272 may be provided to extend and retract the leg supports 260 and rotate the leg supports 260 with respect to the seat 242. These actuators 270 & 272 may be pneumatically powered and may be conveniently controlled by a controller 276 which may be mounted to a handrest 256.

It is believed that the adjustable wheelchair of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A tip resistant wheelchair, comprising:

a frame including a pair of generally opposed curvilinear frame members;

a pair of wheels mounted to the frame with at least one axle;

a seat; and a seat suspension member for suspending the seat from the curvilinear members;

wherein the seat suspension member pivotally suspends the seat from the curvilinear members so that the seat is capable of tilting in a pendulum motion for substantially maintaining the center of gravity of the wheelchair as the seat is tilted; and wherein the curvilinear members include generally curved sections having diameters larger than the diameters of the wheels for supporting shields for at least partially shielding a user seated in the seat from the wheels as the seat is tilted.

2. The wheelchair of claim 1, further comprising a shield attached to at least one of said curved sections for shielding a user seated in the seat from the wheels as the seat is tilted.

3. The wheelchair of claim 1, wherein the seat comprises a seat back and a seat bottom, and wherein the seat back is capable of being reclined with respect to the seat bottom.

4. The wheelchair of claim 3, further comprising a leg support assembly, the leg support assembly being mounted to the seat bottom so as to be capable of retraction beneath the seat bottom.

5. The wheelchair of claim 4, wherein the leg support assembly is capable of tilting with the seat so that the angle of the leg support assembly with the seat bottom not changed.

6. The wheelchair of claim 1, further comprising an arm support.

7. The wheelchair of claim 6, wherein the arm support includes a hand support, the hand support having a perimeter edge provided with at least one indentation for each finger of a user's hand wherein the indentations are spaced so as to be suitable for receiving and at least partially extending a user's fingers.

8. The wheelchair of claim 6, wherein the arm support is capable of being tilted with the seat so that the angle of the arm support with the seat bottom is not changed.

9. The wheelchair of claim 1, further comprising a storage rack mounted to at least one of the wheels.

10. The wheelchair of claim 6, further comprising a holder mounted to the arm support, the holder capable of remaining substantially level as the seat is tilted.

11. The wheelchair of claim 1, further comprising a motor mounted to the frame and coupled to the at least one axle, the motor being capable of turning at least one of the wheels for providing motive force to the wheelchair.

12. The wheelchair of claim 1, further comprising an actuating assembly for tilting the seat.

* * * * *